B. K. HALL.
SHOCK ABSORBER.
APPLICATION FILED APR. 13, 1916.
1,215,269.
Patented Feb. 6, 1917.
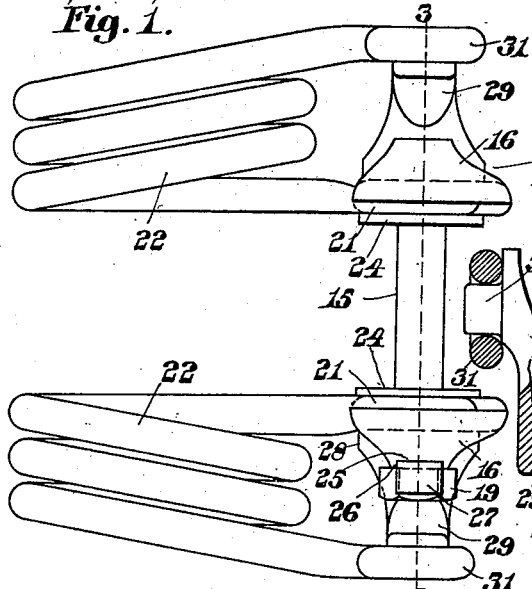
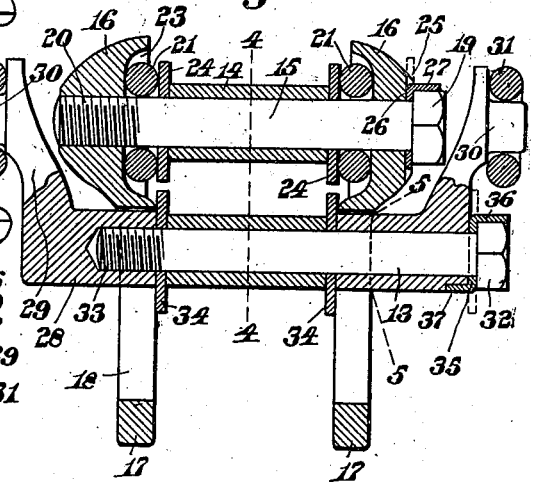
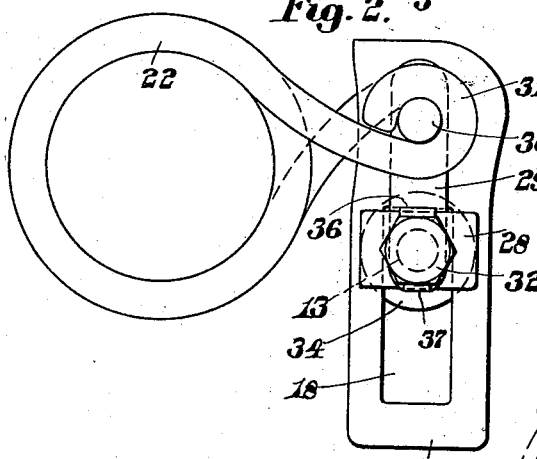
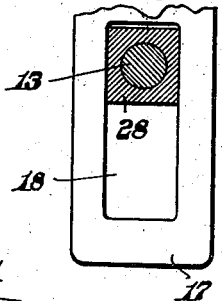
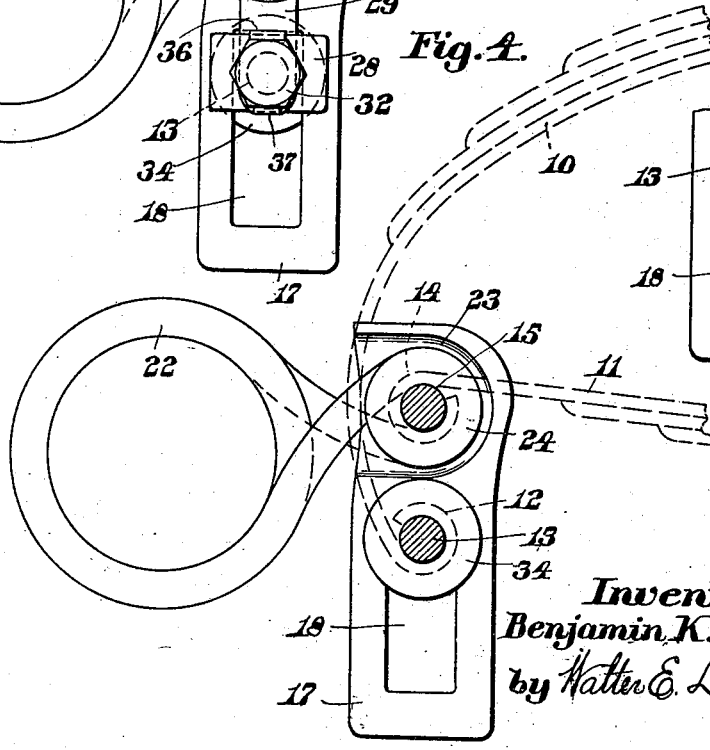
Inventor:
Benjamin K. Hall,
by Walter E. Lombard,
Atty.

UNITED STATES PATENT OFFICE.

BENJAMIN K. HALL, OF MERRIMAC, MASSACHUSETTS.

SHOCK-ABSORBER.

1,215,269.  Specification of Letters Patent.  Patented Feb. 6, 1917.

Application filed April 13, 1916. Serial No. 91,499.

*To all whom it may concern:*

Be it known that I, BENJAMIN K. HALL, a citizen of the United States of America, and a resident of Merrimac, in the county of Essex and State of Massachusetts, have invented certain new and useful Improvements in Shock-Absorbers, of which the following is a specification.

This invention relates to shock absorbers adapted for use on motor vehicles and particularly to devices of this character that are attached to the leaf springs of the vehicle.

The object of the invention is to provide the leaf springs of a vehicle with auxiliary or extension springs interposed between the ends thereof whereby the vehicle will be made to ride more easily and to limit the movement of said auxiliary springs so that they never will be affected beyond their carrying capacity.

The invention consists of certain novel features of construction and arrangement of parts which will be fully understood by reference to the description of the drawings and to the claims hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of those instrumentalities as herein shown and described.

Of the drawings:

Figure 1 represents a plan of a device embodying the principles of the present invention.

Fig. 2 represents a side elevation thereof.

Fig. 3 represents a transverse vertical section of the same on line 3—3 on Fig. 1.

Fig. 4 represents a longitudinal section of the same on line 4—4 on Fig. 3, and

Fig. 5 represents a sectional detail on line 5—5 on Fig. 3.

Similar characters designate like parts throughout the several figures of the drawings.

In the drawings, 10 and 11 are the usual leaf springs of an automobile, the ends of which are fastened directly together or connected through some intermediate device. As shown in the drawings, the end 12 of the upper spring 10 extends around a bolt 13, while the end 14 of the lower spring 11 extends around the bolt 15. The bolt 15 extends through the side plates 16, each of which is provided with a depending arm 17 having a slot 18 extending longitudinally thereof.

The bolt 15 is provided with a hexagonal head 19 and its opposite end is threaded at 20 to one of the side members 16. Surrounding the bolt 15 are two eyes 21 formed upon the inner ends of the helical springs 22. These eyes 21 are partially positioned within depressions 23 formed in the inner faces of the side members 16.

Preferably positioned between the eyes 21 and the end 14 of the spring 15 are washers 24 surrounding the bolt 15. One of the side members 16 has formed in its outer face a groove 25 in which is positioned a plate 26 in such a manner that said plate cannot rotate about the axis of the bolt 15. When said bolt 15 has been adjusted to its proper position in the side members 16, the end 27 of said plate 26 is bent over against a flat side of the head 19 and locks the bolt from further rotation in either direction. In each slot 18 of the depending arm 17 is mounted a slidable member 28 provided with an upwardly extending arm 29 having an outwardly extending stud 30 formed thereon, said studs 30 when in their normal positions being in alinement with the axis of the bolt 15.

The outer ends of the helical springs 22 have eyes 31 formed thereon which encircle the studs 30. The slidable members 28 are held together by means of the bolt 13 which has a hexagonal head 32 at one end and extends through one of the slidable members 28, the end 12 of the leaf spring 10, and is threaded to the other slidable member 28, as indicated at 33. Between the inner faces of the slidable members 28 and the outer faces of the end 12 are preferably positioned washers 34 extending around the bolt 13.

Between the head 32 and the outer face of the adjacent slidable member 28 is a plate 35, the upper end of which is adapted to be turned over against the flat side of the head 32, as indicated at 36 when the bolt 13 has been adjusted to its proper position.

When this adjustment has been made and the end 36 is in engagement with the head 32, the lower end 37 of the plate 35 is bent over into a groove formed in the under face of the slidable member 28. This plate with its ends 36—37 bent in this manner effectually locks the bolt 13 from further rotation.

When the springs 10—11 are subjected to excessive load or strain, the bolt 13 will be moved downwardly carrying therewith the slidable members 28 and increasing the torsion of the helical springs 22. When this additional strain has been removed, the helical springs 22 will return to their normal positions with the axis of the eyes thereof in alinement, as shown in Figs. 3 and 4 of the drawings.

The entire structure forms a yoke connecting the ends 12 and 14 of the springs 10 and 11 respectively. Should either or both of the helical springs 22 become inoperative, it is obvious that the ends 12 and 14 of the springs 10 and 11 will be connected by means of this yoke, the springs 10 and 11 then acting in the same manner that they would act prior to the installation of the helical springs 22 thereon.

By the use of these auxiliary helical springs 22 applied to the ordinary leaf springs 10 and 11, the car to which they are applied will ride much more easily and its life will be materially lengthened, owing to the fact that the racking that is ordinarily imparted to the parts of the car is almost entirely eliminated.

Owing to the movement of the slidable members 28 being limited by the length of the slots 18, it is obvious that when the car is overloaded the springs will not be affected beyond their carrying capacity.

Another advantage of the device is that the yokes are so constructed that they will hold the body of the car firmly in place preventing all side sway, which, when it occurs, is liable to cause the crystallization and breakage of the leaf springs.

While in the embodiment illustrated in the drawings the helical springs are shown attached between two springs of a pair, it is obvious that they may be used in connection with the single leaf spring with the eyes 21 thereof secured to a fixed support.

The construction of the yoke is such that the various parts thereof may be made to accommodate themselves to any width of leaf springs 10 and 11 which vary in the different cars.

One great advantage of the construction of the yoke is the omission of all nuts, the bolts being threaded directly to a side member and a slidable member, and when once adjusted being effectively locked from further rotation by means of the novel locking means provided therefor. There is considerable advantage in providing the side members 16 with the depressions 23 to receive the eyes 21, as by the positioning of the eyes within the depressions 23 the inner portions of the helical springs 22 are substantially parallel and outside the edges of the leaf springs.

This construction makes it possible to locate the helical springs 22 closely adjacent to the opposite faces of the leaf springs 10 and 11, while actual contact therewith is absolutely prevented.

It is believed that the operation and many advantages of this invention will be fully apparent from the foregoing description.

Having thus described my invention, I claim:

1. In a device of the class described, a yoke adapted to be secured to an end of a leaf spring and provided with two parallel slotted arms having depressions in their inner faces; a member secured to another end of said leaf spring and extending through the slots in said arms and movable therein; and two helical springs having their outer ends secured to said movable member and their inner ends positioned within said depressions and connected to said yoke.

2. In a device of the class described, a yoke adapted to be secured to an end of a leaf spring and provided with two parallel slotted arms having depressions in their inner faces; a member secured to another end of said leaf spring and extending through the slots in said arms and movable therein, said movable member having upwardly extending arms each provided with an outwardly extending stud; and two helical springs having their outer ends provided with loops surrounding said studs on said movable member and their inner ends positioned within said depressions and connected to said yoke.

3. In a device of the class described, a yoke adapted to be secured to an end of a leaf spring and provided with two parallel slotted arms; a member slidable in the slot of each arm and provided with an outwardly extending stud; a bolt extending through one of said slidable members and threaded to the other of said slidable members and connected to another end of said leaf spring; and two helical springs having their outer ends secured respectively to said yoke and said studs.

4. In a device of the class described, a yoke adapted to be secured to an end of a leaf spring and provided with two parallel slotted arms; a member slidable in the slot of each arm and provided with an outwardly extending stud; a bolt extending through one of said slidable members and threaded to the other of said slidable members and connected to another end of said leaf spring; means for preventing the rotation of said bolt; and two helical springs having their outer ends secured respectively to said yoke and said studs.

5. In a device of the class described, a yoke adapted to be secured to an end of a leaf spring and provided with two parallel slotted arms; a member slidable in the slot of each arm and provided with an outwardly extending stud; a bolt extending through one of said slidable members and threaded to the other of said slidable members and connected to another end of said leaf spring; means surrounding said bolt and provided with two ears adapted to be bent over against a flat side of the bolt head and the end of a slidable member to lock said bolt from rotation; and two helical springs having their outer ends secured respectively to said yoke and said studs.

6. In a device of the class described, two side plates provided with oppositely disposed slots; a bolt extending through said side plates and adapted to be connected to an end of a leaf spring; a slidable member in each slot having an upwardly extending arm provided with an outwardly extending stud normally alined with said bolt; a connector between said slidable members adapted to be connected with another end of said leaf spring; and two helical springs each connected at one end to said bolt and at the other end to said stud.

7. In a device of the class described, two side plates provided with oppositely disposed slots; a bolt extending through said side plates and adapted to be connected to an end of a leaf spring; a slidable member in each slot having an upwardly extending arm provided with an outwardly extending stud normally alined with said bolt; a second bolt extending through one of said slidable members and threaded to the other of said slidable members and adapted to be connected with another end of said leaf spring; and two helical springs each connected at one end of said bolt and at the other end to said stud.

8. In a device of the class described, two side plates provided with oppositely disposed slots; a bolt extending through said side plates and adapted to be connected to an end of a leaf spring; a slidable member in each slot having an upwardly extending arm provided with an outwardly extending stud normally alined with said bolt; a second bolt extending through one of said slidable members and threaded to the other of said slidable members and adapted to be connected with another end of said leaf spring; an ear secured to one of said side plates and adapted to be bent against a flat side of the head of the first mentioned bolt to prevent its rotation; and two helical springs each connected at one end to said bolt and at the other end to said stud.

9. In a device of the class described, two side plates provided with oppositely disposed slots; a bolt extending through said side plates and adapted to be connected to an end of a leaf spring; a slidable member in each slot having an upwardly extending arm provided with an outwardly extending stud normally alined with said bolt; a second bolt extending through one of said slidable members and threaded to the other of said slidable members and adapted to be connected with another end of said leaf spring; a plate set into a slot formed in one of said side plates and provided with an ear adapted to be bent against a flat side of the head of the first mentioned bolt to prevent its rotation, and two helical springs each connected at one end to said bolt and at the other end to said stud.

Signed by me at 4 Post Office Sq., Boston, Mass., this 7th day of April, 1916.

BENJAMIN K. HALL.

Witnesses:
WALTER E. LOMBARD,
MARY C. SMITH.